US008834244B2

(12) United States Patent
Isaac et al.

(10) Patent No.: US 8,834,244 B2
(45) Date of Patent: Sep. 16, 2014

(54) FLOW DISTRIBUTION SYSTEM FOR CONTROLLING APPLICATION WIDTH OF RESIDUAL CROP MATERIAL

(75) Inventors: Nathan E. Isaac, Lancaster, PA (US); Jason M. Benes, Waverly, NE (US)

(73) Assignee: CNH Industrial America LLC, New Holland, PA (US)

( * ) Notice: Subject to any disclaimer, the term of this patent is extended or adjusted under 35 U.S.C. 154(b) by 50 days.

(21) Appl. No.: 13/557,801

(22) Filed: Jul. 25, 2012

(65) Prior Publication Data

US 2014/0031096 A1  Jan. 30, 2014

(51) Int. Cl.
*A01F 12/30* (2006.01)

(52) U.S. Cl.
USPC .......................................... 460/111; 460/901

(58) Field of Classification Search
USPC .................... 460/111, 112, 119, 901
See application file for complete search history.

(56) References Cited

U.S. PATENT DOCUMENTS

| | | | |
|---|---|---|---|
| 3,186,460 A | 6/1965 | Frederick | |
| 4,612,941 A * | 9/1986 | Kunde | 460/112 |
| 4,917,652 A * | 4/1990 | Glaubitz et al. | 460/111 |
| 5,021,028 A * | 6/1991 | Kersting et al. | 460/85 |
| 5,232,405 A * | 8/1993 | Redekop et al. | 460/112 |
| 5,421,777 A | 6/1995 | Strubbe et al. | |
| 5,482,508 A * | 1/1996 | Redekop et al. | 460/112 |
| 5,556,042 A * | 9/1996 | Roberg | 241/101.76 |
| 5,928,080 A * | 7/1999 | Jakobi | 460/112 |
| 6,070,816 A * | 6/2000 | Hirsch | 241/101.742 |
| 6,113,491 A * | 9/2000 | Holmen | 460/111 |
| 6,598,812 B1 * | 7/2003 | Matousek et al. | 239/682 |
| 6,602,131 B2 | 8/2003 | Wolters | |
| 6,616,528 B2 | 9/2003 | Wolters et al. | |
| 6,663,485 B2 | 12/2003 | Niermann | |
| 6,699,121 B2 * | 3/2004 | Bognar et al. | 460/112 |
| 6,719,627 B2 * | 4/2004 | Wolters et al. | 460/111 |
| 6,769,980 B2 | 8/2004 | Wolters et al. | |
| 6,840,854 B2 * | 1/2005 | Redekop | 460/112 |
| 6,893,340 B1 * | 5/2005 | Schmidt et al. | 460/111 |
| 7,086,942 B2 * | 8/2006 | Niermann et al. | 460/111 |
| 7,104,883 B2 * | 9/2006 | Dow | 460/112 |
| 7,223,168 B2 * | 5/2007 | Anderson et al. | 460/111 |
| 7,281,973 B2 * | 10/2007 | Anderson et al. | 460/111 |
| 7,281,974 B2 * | 10/2007 | Anderson et al. | 460/111 |
| 7,297,053 B2 * | 11/2007 | Farley | 460/112 |
| 7,390,253 B2 | 6/2008 | Farley et al. | |
| 7,473,169 B2 | 1/2009 | Isaac | |
| 7,484,350 B2 * | 2/2009 | Benes et al. | 56/504 |
| 7,487,024 B2 * | 2/2009 | Farley et al. | 701/50 |

(Continued)

*Primary Examiner* — Thomas B Will
*Assistant Examiner* — Joan D Misa
(74) *Attorney, Agent, or Firm* — Seyed V. Sharifi T.; Patrick M. Sheldrake

(57) ABSTRACT

A flow distribution system for use with a combine spreader having an inlet opening at the top thereof for receiving crop residue, a pair of counter-rotating spreader paddles disposed generally side by side and forward of a back plate of the spreader, and a discharge opening below the spreader paddles. A flow guide element has an apex portion and a pair of opposed arm portions pivotally connected to the apex portion, the arm portions laterally extending to free end portions. An adjusting mechanism is operably connected to the arm portions to effect rotational movement of the arm portions about the apex portion, ends of spreader paddle members defining the outer swept diameters of the pair of spreader paddles and the crop residue flow surfaces of at least the arm portions defining clearance regions therebetween to controllably distribute crop residue in a desired pattern over a field.

20 Claims, 9 Drawing Sheets

(56) References Cited

U.S. PATENT DOCUMENTS

| | | | |
|---|---|---|---|
| 7,553,227 B2* | 6/2009 | Landuyt | 460/111 |
| 7,927,200 B2* | 4/2011 | Van Overschelde et al. | 460/112 |
| 8,118,650 B2* | 2/2012 | Isaac et al. | 460/111 |
| 2002/0119809 A1* | 8/2002 | Bognar et al. | 460/112 |
| 2003/0109293 A1* | 6/2003 | Wolters | 460/111 |
| 2003/0109294 A1 | 6/2003 | Wolters et al. | |
| 2008/0305842 A1* | 12/2008 | Benes et al. | 460/112 |
| 2009/0111548 A1* | 4/2009 | Landuyt | 460/112 |

\* cited by examiner

US 8,834,244 B2

FLOW DISTRIBUTION SYSTEM FOR CONTROLLING APPLICATION WIDTH OF RESIDUAL CROP MATERIAL

FIELD OF THE INVENTION

This invention relates generally to an agricultural combine and a flow distributor system therefore which is operable for controlling the spread width discharge of a flow of straw or other crop residue in a sideward direction for deposit on and over a field, and the method of use thereof, and, more particularly, to an adjustably positionable flow guide element operably connected to an arm portion for a spreader, which flow guide element and arm portions are located generally intermediately adjacent to counterrotating spreader paddles of the spreader to receive and direct the flow of crop residue therefrom, which arm portion is adjustably repositionable relative to the spreader paddles and configured to mesh with the spreader paddles to controllably adjust the flow of crop residue to effect a desired pattern of crop residue flow therefrom, for instance, so as to more efficiently distribute the crop residue over a swath of an agricultural field from which the crop was harvested.

BACKGROUND OF THE INVENTION

Historically, combines have typically included or had associated therewith a crop residue spreader for disposing onto the field from which the crop was harvested the straw and other residue separated from the harvested crop. In addition, some combines have employed a chaff spreader for spreading chaff residue separated from the grain by the cleaning apparatus or system onto the crop field. It is desirable to provide an even distribution of crop residue across the entire cut-width of the combine. However, as header widths have continued to increase, additional power, such as in the form of larger spreaders or spreader components operating at elevated speeds would generally be required to increase the sidewardly directed distribution distance.

Thus, what has been sought is a crop residue flow distribution system for a crop residue spreader, having a capability to more efficiently distribute or guide portions of a discharged flow of crop residue for achieving a desired pattern of the distributed residue across the entire width or swath of the harvest cut, while minimizing the amount of increased power associated with such distribution, to thereby achieve the advantages, and avoid the shortcomings and problems, of conventional devices.

SUMMARY OF THE INVENTION

The present invention relates to a flow distribution system for use with a combine spreader having an inlet opening at the top and/or front thereof for receiving crop residue, a pair of counter-rotating spreader paddles disposed generally side by side and forward of a back plate of the spreader, and a discharge opening below the spreader paddles. The system includes a flow guide element having fore and aft ends, an apex portion, and a pair of opposed arm portions pivotally connected to the apex portion, the arm portions laterally extending to free end portions. The apex portion and the arm portions include surfaces extending longitudinally between the fore and aft ends of the flow guide element, the longitudinally extending surfaces defining crop residue flow surfaces. The flow guide element is disposed generally adjacent to the back plate of the spreader and generally intermediate to the spreader paddles, with the aft end generally proximate to the front side of the back plate of the spreader, with the crop residue flow surfaces generally opposite the inlet opening of the spreader. At least the free end portions are disposed such that the crop residue flow surfaces are located generally extending circumferentially about portions of the spreader paddles and sidewardly outwardly relative thereto to the free end portions of the arm portions of the flow guide element. An adjusting mechanism is operably connected to the arm portions. The adjusting mechanism is operable to effect rotational movement of the arm portions about the apex portion, the movement of the arm portions relative to the spreader paddles adjustably varying the clearance between the outer swept diameters of the pair of spreader paddles and the crop residue flow surfaces of the arm portions. Ends of spreader paddle members define the outer swept diameters of the pair of spreader paddles and the crop residue flow surfaces of at least the arm portions defining clearance regions therebetween. As a flow of crop residue is introduced into the inlet opening of the spreader, at least a portion of such flow is directed towards the crop residue surfaces of the flow guide element by operation of the counter-rotating spreader paddles and is adjustably directed by the flow guide element. Dependent upon its positioning relative to the spreader paddles, crop residue is sidewardly outwardly discharged through the discharge opening of the spreader to controllably distribute the crop residue in a desired pattern over a field.

The present invention further relates to an agricultural combine including a flow distribution system for use with a spreader comprising an inlet opening at the top and/or front thereof for receiving crop residue, a pair of counter-rotating spreader paddles disposed generally side by side and forward of a back plate of the spreader, and a discharge opening below the spreader paddles. The system includes a flow guide element having fore and aft ends, an apex portion, and a pair of opposed arm portions pivotally connected to the apex portion, the arm portions laterally extending to free end portions. The apex portion and the arm portions include surfaces extending longitudinally between the fore and aft ends of the flow guide element, the longitudinally extending surfaces defining crop residue flow surfaces. The flow guide element is disposed generally adjacent to the back plate of the spreader and generally intermediate to the spreader paddles, with the aft end generally proximate to the front side of the back plate of the spreader. The crop residue flow surfaces are generally opposite the inlet opening of the spreader and with at least the free end portions disposed such that the crop residue flow surfaces are located generally extending circumferentially about portions of the spreader paddles and sidewardly outwardly relative thereto to the free end portions of the arm portions of the flow guide element. An adjusting mechanism is operably connected to the arm portions, the adjusting mechanism operable to effect rotational movement of the arm portions about the apex portion. The movement of the arm portions are relative to the spreader paddles adjustably varying the clearance between the outer swept diameters of the pair of spreader paddles and the crop residue flow surfaces of the arm portions. Ends of spreader paddle members define the outer swept diameters of the pair of spreader paddles and the crop residue flow surfaces of at least the arm portions defining clearance regions therebetween. As a flow of crop residue is introduced into the inlet opening of the spreader, at least a portion of such flow is directed towards the crop residue surfaces of the flow guide element by operation of the counter-rotating spreader paddles and is adjustably directed by the flow guide element. Dependent upon its positioning relative to the spreader paddles, crop residue is sidewardly outwardly discharged through the discharge opening of the spreader to controllably distribute the crop residue in a desired pattern over a field.

The present invention further relates to a method for controllably adjusting the flow of crop residue through a spreader and sidewardly outwardly discharge thereof from the spreader for distribution over a field in a desired pattern. The method includes providing a spreader having an inlet opening at the top and/or front thereof for receiving crop residue, a pair of counter-rotating spreader paddles disposed generally side by side and forward of a back plate of the spreader, and a discharge opening below the spreader paddles. The method further includes providing a flow distributor system for use with the spreader including a flow guide element having fore and aft ends, an apex portion, and a pair of opposed arm portions pivotally connected to the apex portion. The arm portions laterally extend to free end portions, the apex portion and the arm portions including surfaces extending longitudinally between the fore and aft ends of the flow guide element. The longitudinally extending surfaces define crop residue flow surfaces, the flow guide element disposed generally adjacent to the back plate of the spreader and generally intermediate to the spreader paddles. The aft end generally proximate to the front side of the back plate of the spreader, with the crop residue flow surfaces generally opposite the inlet opening of the spreader, and with at least the free end portions disposed such that the crop residue flow surfaces are located generally extending circumferentially about portions of the spreader paddles and sidewardly outwardly relative thereto to the free end portions of the arm portions of the flow guide element. The method further includes providing an adjusting mechanism operably connected to the arm portions. The method further includes operating the adjusting mechanism to effect rotational movement of the arm portions about the apex portion. The movement of the arm portions relative to the spreader paddles adjustably varying the clearance between the outer swept diameters of the pair of spreader paddles and the crop residue flow surfaces of the arm portions. Ends of spreader paddle members define the outer swept diameters of the pair of spreader paddles and the crop residue flow surfaces of at least the arm portions defining clearance regions therebetween. As a flow of crop residue is introduced into the inlet opening of the spreader, at least a portion of such flow is directed towards the crop residue surfaces of the flow guide element by operation of the counter-rotating spreader paddles and is adjustably directed by the flow guide element. Dependent upon its positioning relative to the spreader paddles, crop residue is sidewardly outwardly discharged through the discharge opening of the spreader to controllably distribute the crop residue in a desired pattern over a field.

An advantage of the present invention is the capability to selectively control distribution of crop residue in a more efficient manner.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
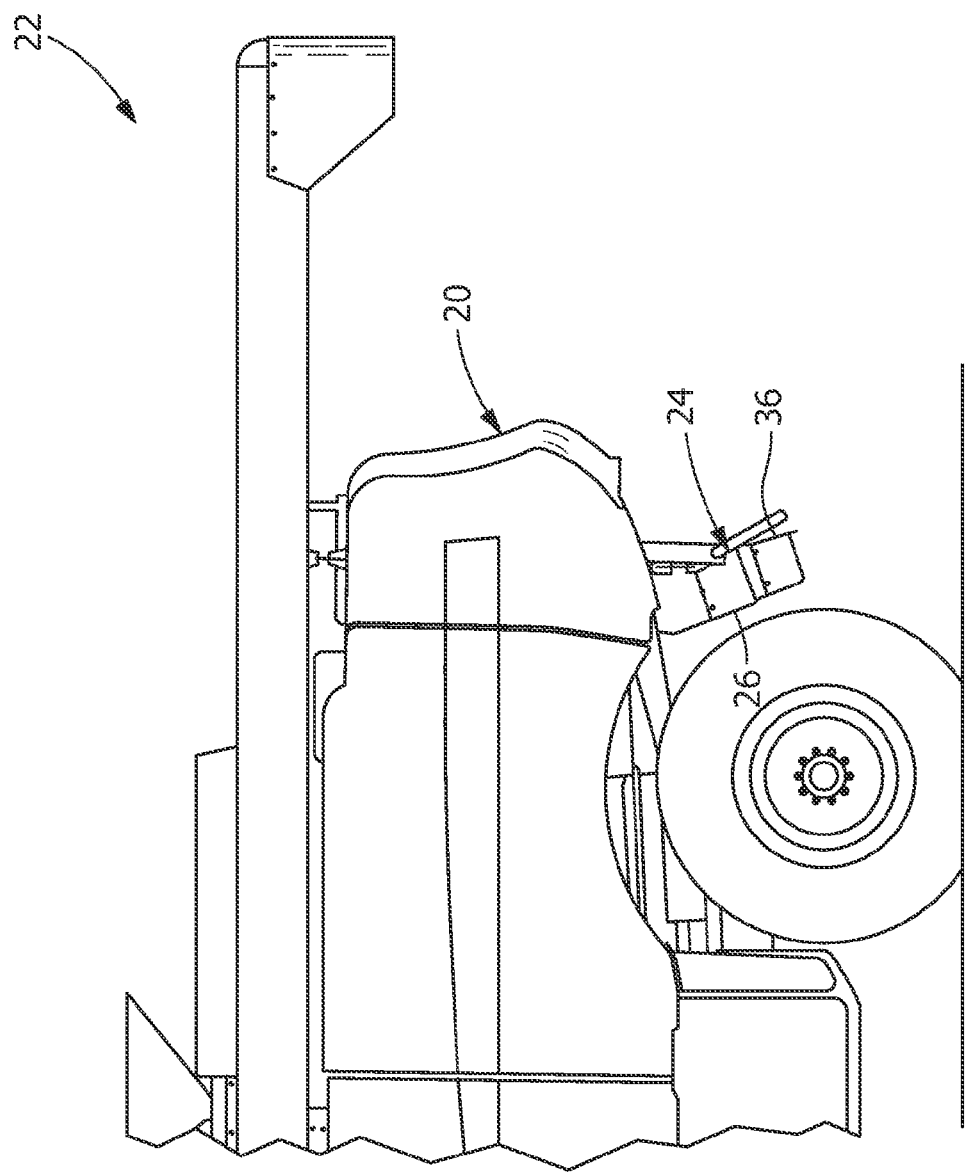
FIG. 1 is a simplified, fragmentary side view of the rear end of a representative agricultural combine that has associated therewith a crop residue distribution system, including a spreader that includes a pair of spreader paddles for spreading crop residue.

Referring now to the drawings, wherein preferred embodiments of the present invention are shown, wherein like numerals refer to like items, FIG. 1 depicts a rear end 20 of a self-propelled agricultural combine 22, including a vertical crop residue spreader 24 operable for spreading straw, stalks, or other crop residue and trash that has been separated from the grain of the crops by a threshing mechanism (not shown) of combine 22 located forwardly of rear end 20. The straw, stalks and the like are propelled rearwardly by rotating beaters or the like (also not shown) from the threshing mechanism and downwardly through a rear cavity of combine 22 to vertical spreader 24, which includes within a housing 26 of sheet metal or other construction, components for effecting the spread and optional chopping of crop residue thereby, all in the well known manner.

Figure 2:
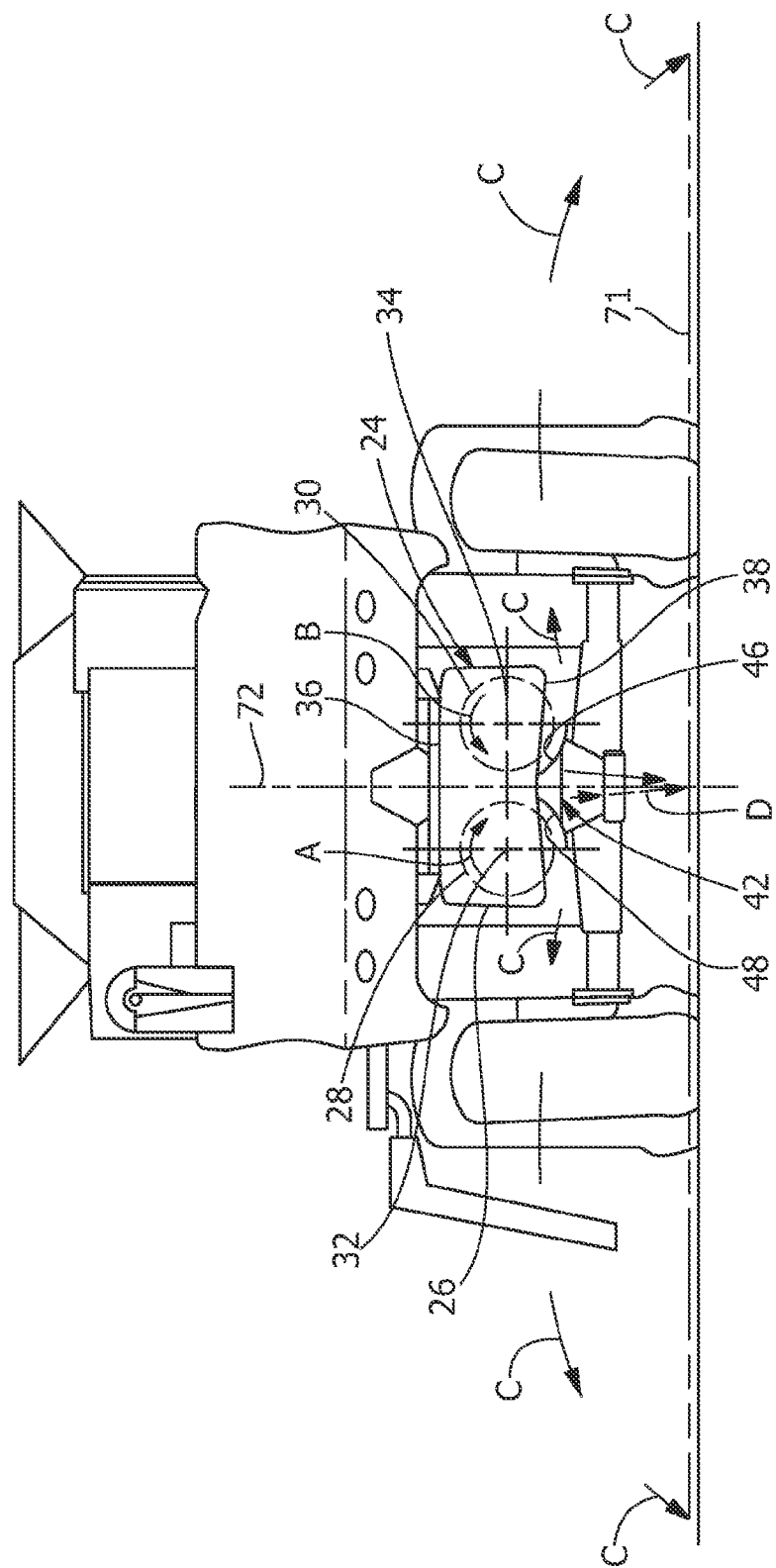
FIG. 2 is a rear view of such combine, generally depicting the location of the crop residue distribution system and certain components thereof.

With further reference to FIG. 2, where, for purposes of clarity, certain elements or components associated with the rear or aft portion of the back sheet or back plate of the spreader 24 are not necessarily shown, spreader 24 is depicted including a pair of side by side rotary impellers 28 and 30 rotatable in opposite predetermined rotational directions, denoted by arrows A and B, about respective rotational axes 32 and 34. Here, it should be understood that impellers 28 and 30 are representative of a variety of rotary devices that can be utilized in a spreader of this type, such as a rotor having fixed blades, or carrying a plurality of knives, such as flail knives, for propelling the crop residue outwardly from the housing. For ease of reference and description hereinafter, the term "spreader paddles" should therefore be understood to include not only the paddle-type blades depicted in the drawings herein, but also the entire variety of rotary devices that may be utilized in or with a spreader of this type. The spreader can additionally optionally include a rank of fixed knives through which the rotating knives pass for chopping crop residue.

Figure 8:
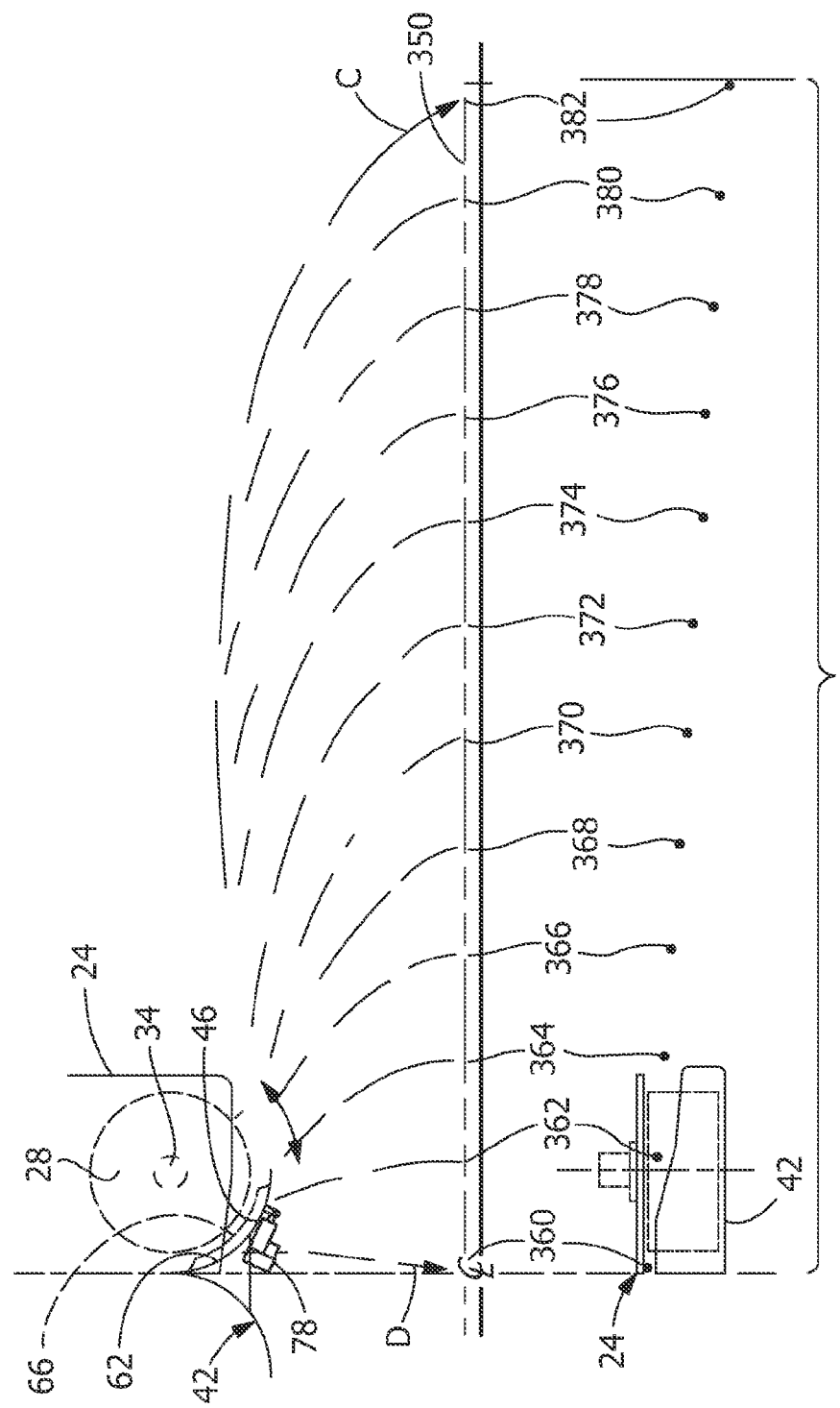
FIG. 8 is a simplified schematic rear view of a right rear end of the spreader and flow distributor apparatus, in combination with a bottom view thereof, diagrammatically illustrating characteristics of a pattern of crop residue flow distribution therefrom.

Impellers 28 and 30, which may form or include paddles of appropriate sizes and configurations for the uses intended, are rotated by suitable driving elements, such as by conventionally constructed and operable hydraulic motors powered by pressurized hydraulic fluid received from a pump (not shown) of combine 22, an electric motor, belt, or the like, again in the well known manner. Rotational axes 32 and 34 extend at least generally in the fore and aft directions, that is, generally forwardly and rearwardly with respect to combine 22, and are generally horizontal or oriented at a small acute angle to horizontal, depending on an orientation or tilt of spreader 24 on combine 22, which can be optionally variable and adjustable in the well known manner. However, although as shown in FIG. 8 as a 90 degree projection of a generally horizontally oriented spreader 24, spreader 24 may alternately be oriented in a generally vertical position. In another embodiment, the spreader could be oriented between a generally vertical position and a generally horizontal position.

Housing 26 of spreader 24 includes spaced, opposed radial side walls, and a rear wall 36, sometimes referred to as the back sheet or back plate of the spreader, extending therebetween across the width of spreader 24, defining an internal cavity containing impellers 28 and 30. Housing 26 defines a forwardly and upwardly facing inlet opening 45 for receiving the residue flow from the threshing system, and a downwardly facing discharge opening 38 positioned generally opposite inlet opening 45, through which the residue is propelled downwardly and in opposite sideward directions by impellers 28 and 30, respectively.

Residue flow within housing 26 is propelled by the rotating impellers 28 and 30 in the predetermined rotational directions A and B along circumferential flow paths, at speeds equal to or increased relative to the inlet speed of the residue flow such that the residue does not build up at the inlet and is expelled from housing 26 through discharge opening 38 at a corresponding speed. In the instance wherein spreader 24 is solely used for spreading, the speed imparted to the residue by impellers 28 and 30 will be sufficient to effect airborne travel of the residue a substantial sideward distance from combine 22 for deposit on regions of the agricultural field over which combine 22 has just traveled and from which the crops have been harvested.

As noted hereinabove, it is generally desirable to distribute the crop residue discharged by impellers 28 and 30 substantially evenly over the width of a swath of the field from which the crop has just been harvested by combine 22, which width is typically defined by the overall width of a harvesting head of combine 22, which width can be as much as 30 to 40 feet in the instance of some heads currently in use. Thus, it is desirable that rotary impellers 28 and 30 have the capability to expel or propel crop residue a distance of up to about 20 feet or so therefrom, corresponding to one-half the width of the header used on combine 22, and possibly farther as combine headers of greater width are introduced. Impellers 28 and 30 can be suitably configured and rotated at a sufficient velocity for propelling crop residue such as, but not limited to, chopped straw, stems and branches, cobs and the like, the required distance of up to one-half the width of a header currently being used, by a conventional hydraulic motor or any other suitable driver as mentioned above. Problems to be currently overcome, however, are distributing the crop residue substantially evenly over this distance of up to about 20 feet or so, including in the region of a swath directly beneath spreader 24, while minimizing the amount of increase of rotational speed of the impellers, or without increasing the swath diameter of the impellers, either of which would require an increase in power from the combine in order to operate.

Flow distributor or flow distribution system 40 of the present invention is primarily associated with spreader 24, and especially with back sheet or back plate 36 thereof. As depicted collectively in FIGS. 3-6, one possible embodiment of flow distribution system 40 according to the present invention may include a flow guide element portion, flow guide or flow guide element 42 disposed within housing 26 of spreader 24 abutting back sheet 36. As shown, flow guide element 42, which is preferably of suitable, rigid construction having a low coefficient of friction, such as of sheet metal, or plastics, or having a low-friction coating applied to the surface of the flow guide element material, is depicted having an apex portion 44 including pivotal connections 47 with opposed wing or arm portions 46, 48 laterally extending to respective free end portions 50, 52 and extending longitudinally between fore and aft ends 54, 56 thereof, including along angled edges 58, 60, with the longitudinal surfaces 62, 64 defining crop residue flow surfaces. In the particular embodiment depicted, the wing or arm portions 46, 48 are essentially, but need not be, mirror images of one another, with the crop residue flow surfaces 62, 64 including undulations, such as vanes 66 defining a clearance region 67 with spreader paddle members or spreader paddles 70 of impellers 28, 30. Flow guide element 42 serves to guide and carry the received crop residue flow sidewardly outwardly away from spreader 24 and to distribute the crop residue, illustrated by strings of oppositely directed arrows C and downwardly directed arrows D in FIG. 2, for distribution in a pattern on a field or patterned field residue 71, as shown in FIG. 2.

For purposes of clarity in the further discussion of the present invention, it should be understood that, within the context of these discussions, the term "sideward" is meant to refer to or identify a direction generally transverse to the fore and aft directions, the term "sidewardly outwardly" is meant to refer to a sideward direction away from a center line 72 (FIG. 2) of spreader 24, and the term "sidewardly inwardly" is meant to refer to a sideward direction towards or closer to center line 72.

Figure 3:
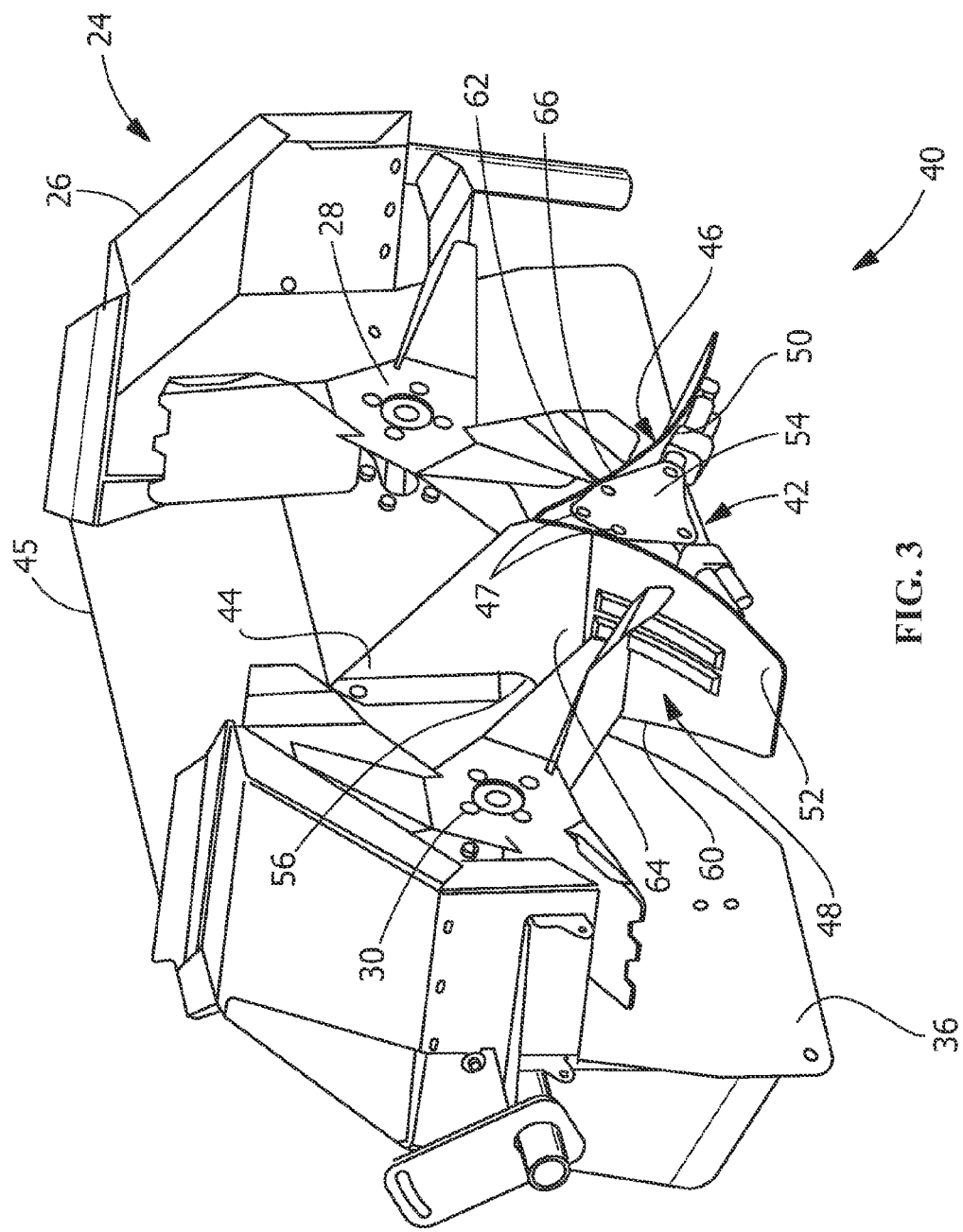
FIG. 3 is a perspective view of a portion of the spreader showing the positioning of the spreader paddles relative to a flow guide element of the present invention.
Figure 4:
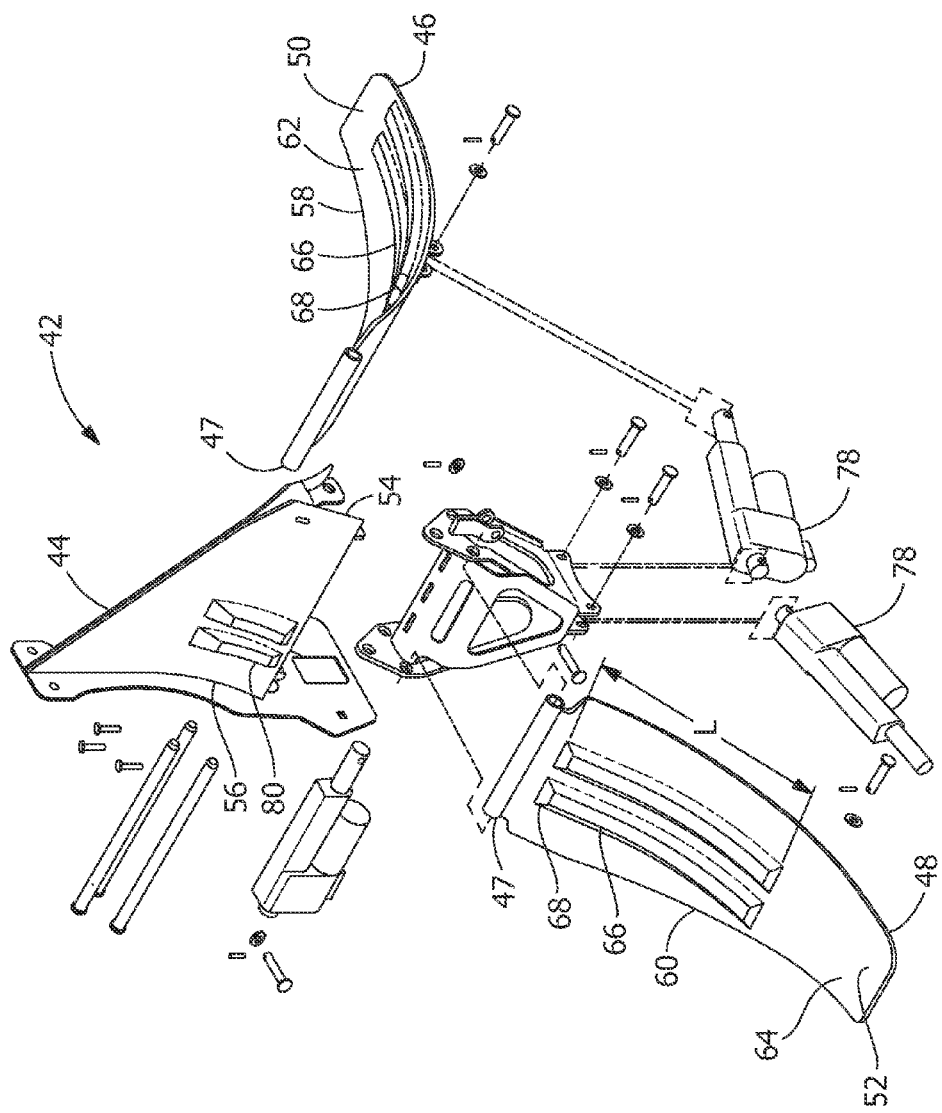
FIG. 4 is an exploded perspective view of the flow guide element FIG. 3.
Figure 5:
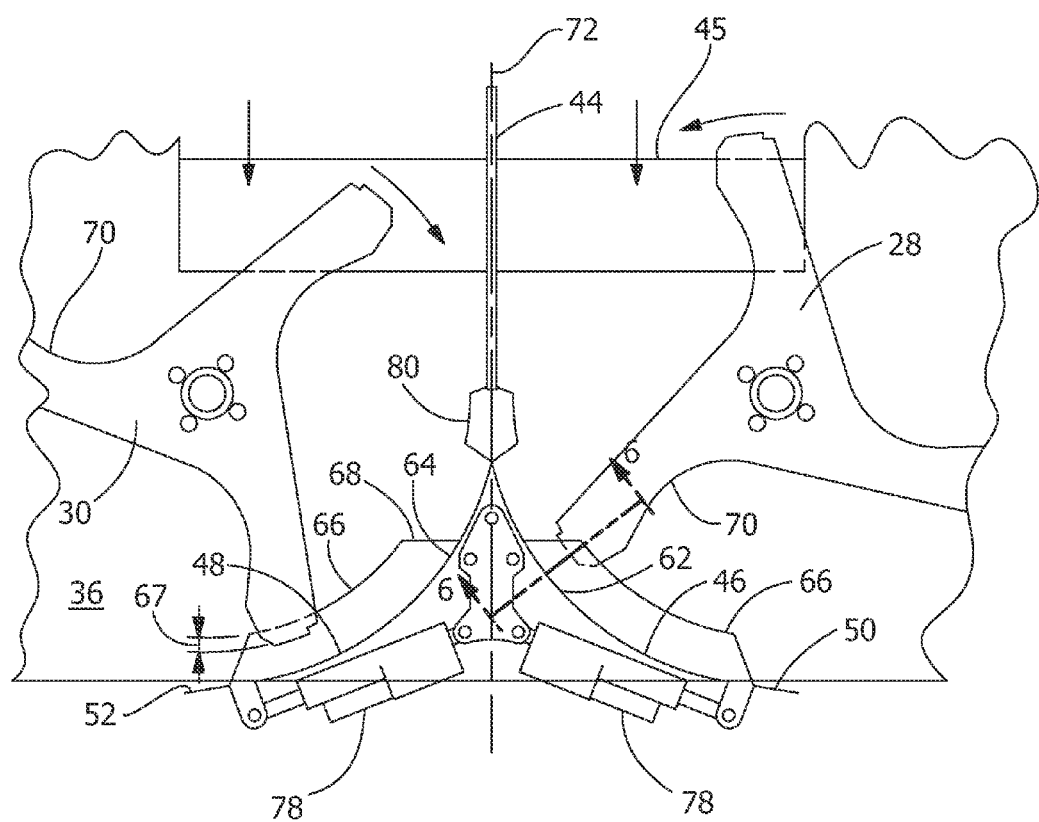
FIG. 5 is a representation of a flow guide element such as it might appear relative to the spreader paddles in a given position.

As may be better observed with reference to FIGS. 3-5, the flow guide element 42 is typically positioned with its aft end 56 in close proximity to, or in abutment with, the front side of back sheet or back plate 36. As shown in the figures, wing or arm portions 46, 48 define a pivotal connection 47 with apex portion 44 and also forms a pivotal connection with an adjusting mechanism 78. The adjustment of adjusting mechanism 78 may be effected by any appropriate means, including, but not limited to, mechanical, hydraulic, and electric means, including through the use of hydraulic cylinders and linear actuators, and in any manner appropriate for the combine and spreader in use. In one embodiment adjusting mechanism may be operatively connected to both arm portions 46, 48.

As may also be observed from FIGS. 3-5, for the particular form of flow guide element 42 disclosed therein, apex portion 44 functions as a center flow divider, which is depicted as being of a projecting generally triangular shape, and extending forwardly from back plate 36 so as to be disposed between impellers 28 and 30, approximately at center line 72, for dividing crop residue flow therebetween and for directing the bulk of residue flow from impeller 28 and its spreader paddles towards wing or arm portion 46 of flow guide element 42 and from impeller 30 and its spreader paddles towards wing or arm portion 48 of flow guide element 42.

Figure 6:
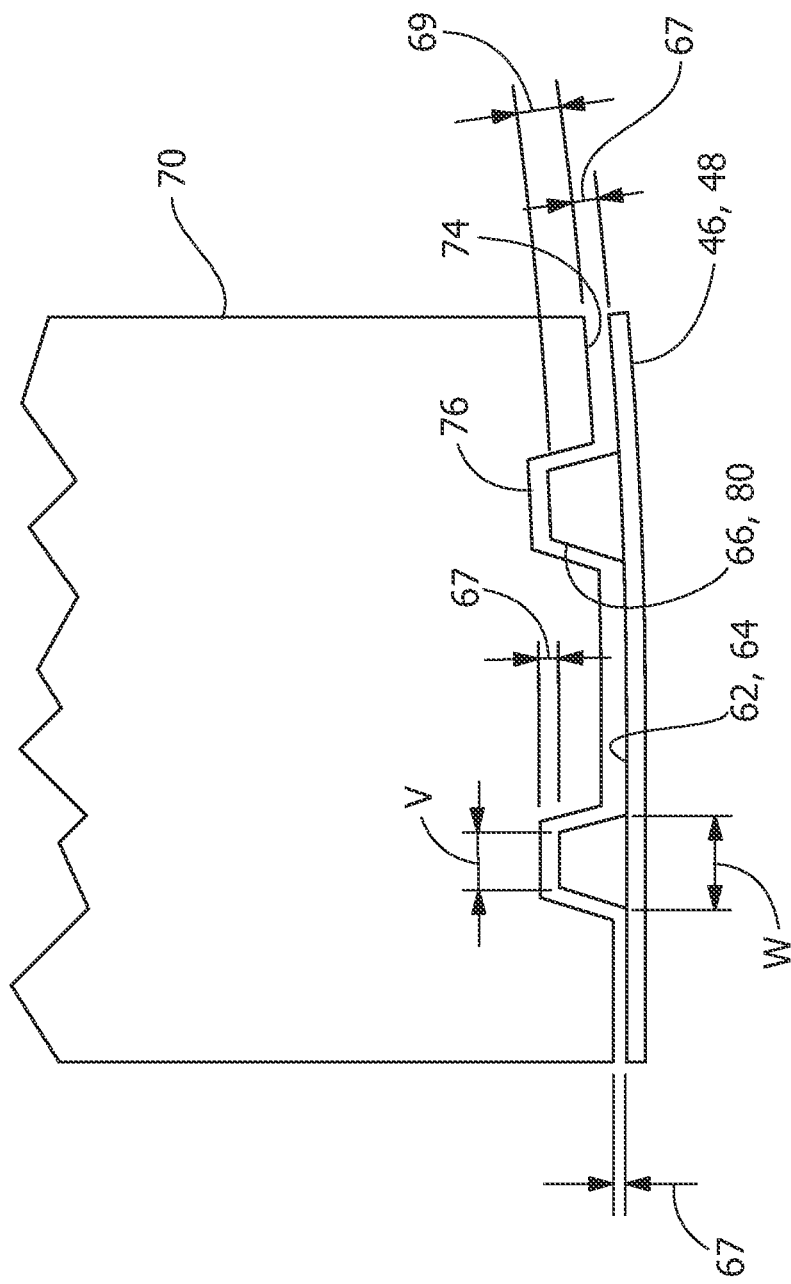
FIG. 6 is a cross-section taken along line 6-6 of FIG. 5 of a meshing spreader paddle and flow guide element.

As shown collectively in FIGS. 4-6, undulations or vanes 66 may be formed in at least one of arm portions 46, 48 to assist with spreading crop residue directed through the spreader. Undulations or vanes 66 may include a tapered leading edge 68 to prevent an accumulation of crop residue thereon. Leading edge 68 may be linear or nonlinear or curved and may have a profile different from the rest of arm portions 46, 48. As shown, vanes 66 define a closed geometry, such as a tapered trapezoidal profile (FIG. 6) although in one embodiment the profile of the vanes 66 may be of a substantially constant width. In one embodiment, as shown in FIG. 6, vanes 66 include a base width W, narrowing to a tip width V. However, in another embodiment, the tip width V may be greater than the base width W. Although a pair of vanes 66 is shown extending from each of arm portions 46, 48, in other embodiments, one vane 66 or more than two vanes 66 may be formed in the arm portions. While vanes 66 are shown having an identical or a similar size and/or profile relative to each other, in other embodiments, the vanes may be sized differently relative to each other, as well as having similar or different lengths L (FIG. 4) relative to each other. As further shown in the figures, one or more vanes 80 may be formed in apex portion 44.

Figure 9:
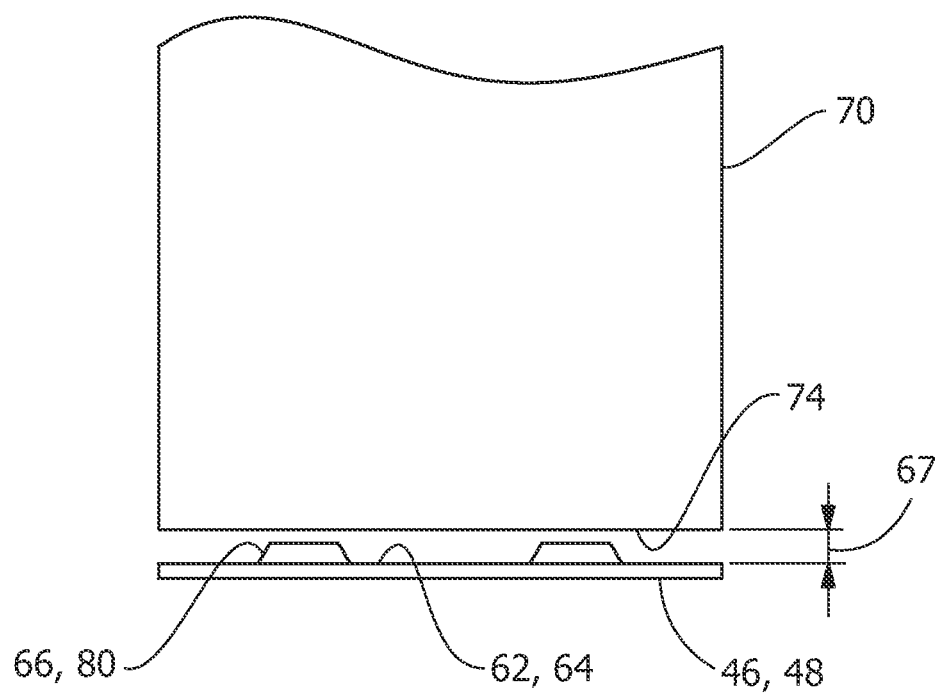
FIG. 9 is a cross-section taken along line 6-6 of FIG. 5 of a meshing spreader paddle and flow guide element.

As shown in FIGS. 4-6, vanes 66, 80 are utilized to assist with spreading crop residue directed through the spreader in several ways. For example, vanes 66, 80 and ends of spreader paddles 70 define generally circumferential clearance regions 67 in which corresponding features 76 formed in ends 74 are aligned with vanes 66, 80, permitting ends 74 to be more closely positioned relative to vanes 66, 80. By virtue of the closer positioning or reduced spacing between vanes 66, 80 and ends 74, and as shown in FIG. 6, overlaps 69 between vanes 66, 80 and clearance regions 67, spreader paddles 70 operate to "comb" crop residue from longitudinal surfaces 62, 64 of arm portions 46, 48. However, in one embodiment, as shown in FIG. 9, vanes 66, 80 and end 74, representing clearance region 67, do not overlap each other, although "combing" is still considered to occur. As a result of such "combing", the interaction between spreader paddles 70 and crop residue is increased, resulting in further operational efficiency increases of the spreader. In addition, the reduced clearance between ends 74 of spreader paddles 70 and arm portions 46, 48 increases operational performance of the spreader. Further, due to vanes 66, 80 raising crop residue relative to the majority of longitudinal surfaces 62, 64 of arm portions 46, 48, the amount of surface area of longitudinal surfaces 62, 64 in contact with crop residue is significantly reduced, therefore significantly reducing the amount of frictional resistance between crop residue and longitudinal surfaces 62, 64. As a result of this reduction in frictional resistance, the amount of torque required to rotationally operate spreader paddles 70 is also reduced. Additionally, vanes 66, 80 reduce turbulent flow of crop residue, which turbulent flow occurring as a result of flow direction perpendicular to radial flow that is parallel to spreader paddles 70. By reducing turbulent flow, and increasing laminar flow in a direction parallel to spreader paddles 70, vanes 66, 80 provide for both enhanced directional control and an increase in distance of crop residue discharged from the spreader.

In operation, as the crop residue enters the top of the spreader 24, the counter-rotating impellers 28 and 30 direct a significant portion of the residue flow towards apex portion 44 operating as a center divider, which will direct residue flowing downwardly therealong towards flow guide element 42. The distance which spreader 24 can discharge crop residue is related to the clearance between the tips of the spreader paddles as the paddles rotate past the flow guide element 42. However, by use of vanes 66, 80 and repositioning arm portions 46, 48 with adjusting mechanism 78 to change the clearance between ends 74 of spreader paddles 70 and longitudinal surfaces 62, 64, as well as utilizing clearance region 67 between ends 74 and surfaces 62, 64 during rotational operation of the paddles relative to the surfaces 62, 64, in which clearance region 67 may or may not include overlap 69 (see FIGS. 6, 9) the spread width of crop residue can be both better controlled and increased, with a minimal increase in torque required to rotate the spreader paddles. That is, due at least in part to the increased focus of the flow of the crop residue for discharge from the spreader 24 made possible by reduced clearance and/or meshing between vanes 66, 80 and surfaces 62, 64 of arm portions 46, 48, in combination with variable clearance between paddles 70 and longitudinal surfaces 62, 64 by adjusting mechanism 78, as discussed previously, both the amount of sidewardly outwardly throw of the crop residue and well as improved directional control of the crop residue can be effected.

Figure 7:
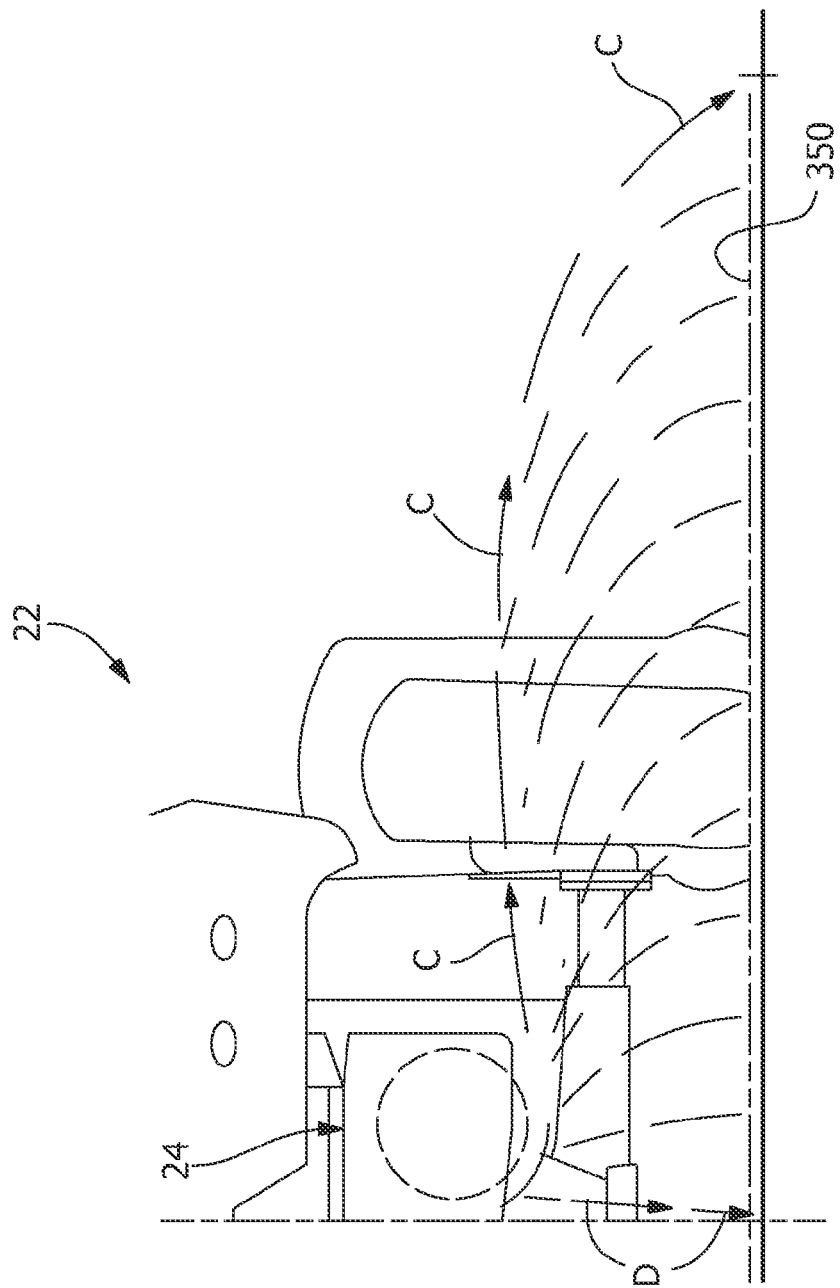
FIG. 7 is a simplified schematic rear view of a right rear end of the combine and spreader, showing a representative pattern of crop residue distribution by the flow distributor apparatus on that side of the spreader.

FIGS. 7 and 8 illustrate crop residue distribution patterns 350 that are possible using a flow distributor apparatus of the present invention in cooperation with a vertical spreader such as spreader 24 on combine 22. As has been discussed hereinabove, particularly in reference to FIG. 2, a substantially even or uniform crop residue distribution pattern, denoted by line 350, can be achieved as between flows C and D, by making required adjustments of the position of arm portions 46, 48 of flow guide element 42, in the above discussed manners. The dots 360-382 in FIG. 8 illustrate approximate locations along pattern 350 where crop residue flowing along the correspondingly numbered lines may be distributed on a field.

As will be appreciated from the foregoing description and discussion, as the clearance between arm portion 46 and meshing of the surfaces of the arm portions, including the vanes, and the outer swept diameter of the spreader paddles of impeller 28 is increased, such as by actuation of adjustment device 78, the throw of crop residue will be altered such that, by way of example, the throw that had before landed at dot 382 (FIG. 8), might now land at dot 374. Consequently, the flow of crop residue can be controllably effected.

In light of all the foregoing, it should thus be apparent to those skilled in the art that there has been shown and described a flow distributor apparatus, and method of use thereof, that can be utilized to provide a desired pattern of crop residue distribution therefrom to obtain a more uniform distribution of crop residue over a swath of an agricultural field from which the crop was harvested, especially under varying geographic and environmental conditions. However, it should also be apparent that, within the principles and scope of the invention, many changes are possible and contemplated, including in the details, materials, steps, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A flow distribution system for use with a combine spreader having an inlet opening at the top or front thereof for receiving crop residue, a pair of counter-rotating spreader paddles disposed generally side by side and forward of a back plate of the spreader, and a discharge opening below the spreader paddles, comprising a flow guide element having
   fore and aft ends,
   an apex portion, and a pair of opposed arm portions pivotally connected to the apex portion, the arm portions laterally extending to free end portions, the apex portion and the arm portions including surfaces extending longitudinally between the fore and aft ends of the flow guide element, the longitudinally extending surfaces defining crop residue flow surfaces, wherein the arm portions each include an elongated vane extending along the crop residue flow surface of the arm portion, the flow guide element disposed generally adjacent to the back plate of the spreader and generally intermediate to the spreader paddles, with the aft end generally proximate to the front side of the back plate of the spreader, with the crop residue flow surfaces generally opposite the inlet opening of the spreader, and with at least the free end portions disposed such that the crop residue flow surfaces are located generally extending circumferentially about portions of the spreader paddles and sidewardly outwardly relative thereto to the free end portions of the arm portions of the flow guide element, an adjusting mechanism operably connected to the arm portions, the adjusting mechanism operable to effect rotational movement of the arm portions about the apex portion, the movement of the arm portions relative to the spreader paddles adjustably varying the clearance between the outer swept diameters of the pair of spreader paddles and the crop residue flow surfaces of the arm portions, ends of spreader paddle members defining the outer swept diameters of the pair of spreader paddles and the crop residue flow surfaces of at least the arm portions defining clearance regions therebetween, whereby, as a flow of crop residue is introduced into the inlet opening of the spreader, at least a portion of such flow is directed toward the crop residue flow surfaces of the flow guide element by operation of the counter-rotating spreader paddles and is adjustably directed by the flow guide element, and guided along the crop residue flow surfaces by the elongated vanes for controllably distributing the crop residue in a desired pattern over a field.

2. The flow distribution system of claim 1, wherein the clearance regions between ends of spreader paddle members and the crop residue flow surfaces include at least one undulation formed on the arm portions by the elongated vanes that meshes with the spreader paddle members.

3. The flow distribution system of claim 2, wherein an undulation of the at least one undulation having a similar profile relative to each other.

4. The flow distribution system of claim 2, wherein an undulation of the at least one undulation having a different profile relative to each other.

5. The flow distribution system of claim 2, wherein a length of an undulation of the at least one undulation having a similar length relative to each other.

6. The flow distribution system of claim 2, wherein a length of an undulation of the at least one undulation having a different length relative to each other.

7. The flow distribution system of claim 1, wherein at least one surface of the apex portion includes an elongated vane extending along the crop residue flow surface of the apex portion.

8. The flow distribution system of claim 1, wherein the pair of counter-rotating spreader paddles are disposed to rotate about an axis that is substantially vertical.

9. The flow distribution system of claim 1, wherein the pair of counter-rotating spreader paddles are disposed to rotate about an axis that is substantially horizontal.

10. The flow distribution system of claim 1, wherein the pair of counter-rotating spreader paddles are disposed to rotate about an axis that is between a substantially vertical position and a substantially horizontal position.

11. The flow distribution system of claim 1, wherein the adjusting mechanism is disposed between the fore and aft ends of the flow guide element.

12. The agricultural combine of claim 11, wherein the ends of spreader paddle members and the elongated vane on the crop residue flow surface defining the clearance region do not overlap each other.

13. The flow distribution system of claim 1, wherein the elongated vane includes a leading edge.

14. The flow distribution system of claim 13, wherein the leading edge is linear.

15. The flow distribution system of claim 13, wherein the leading edge is curved.

16. The flow distribution system of claim 1, wherein at least one elongated vane is formed of a material having a low coefficient of friction.

17. The flow distribution system of claim 1, wherein the ends of spreader paddle members and the elongated vane on the crop residue flow surface defining the clearance region do not overlap each other.

18. An agricultural combine comprising a flow distribution system for use with a spreader comprising an inlet opening at the top or front thereof for receiving crop residue, a pair of counter-rotating spreader paddles disposed generally side by side and forward of a back plate of the spreader, and a discharge opening below the spreader paddles, comprising a flow guide element having fore and aft ends, an apex portion, and a pair of opposed arm portions pivotally connected to the apex portion, the arm portions laterally extending to free end portions, the apex portion and the arm portions including surfaces extending longitudinally between the fore and aft ends of the flow guide element, the longitudinally extending surfaces defining crop residue flow surfaces, wherein the arm portions each include an elongated vane extending along the crop residue flow surface of the arm portion, the flow guide element disposed generally adjacent to the back plate of the spreader and generally intermediate to the spreader paddles, with the aft end generally proximate to the front side of the back plate of the spreader, with the crop residue flow surfaces generally opposite the inlet opening of the spreader, and with at least the free end portions disposed such that the crop residue flow surfaces are located generally extending circumferentially about portions of the spreader paddles and sidewardly outwardly relative thereto to the free end portions of the arm portions of the flow guide element, an adjusting mechanism operably connected to the arm portions, the adjusting mechanism operable to effect rotational movement of the arm portions about the apex portion, the movement of the arm portions relative to the spreader paddles adjustably varying the clearance between the outer swept diameters of the pair of spreader paddles and the crop residue flow surfaces of the arm portions, ends of spreader paddle members defining the outer swept diameters of the pair of spreader paddles and the crop residue flow surfaces of at least the arm portions defining clearance regions therebetween, whereby, as a flow of crop residue is introduced into the inlet opening of the spreader, at least a portion of such flow is directed towards the crop residue surfaces of the flow guide element by operation of the counter-rotating spreader paddles and is adjustably directed by the flow guide element, and guided along the crop residue flow surfaces by the elongated vanes for controllably distributing the crop residue in a desired pattern over a field.

19. A method for controllably adjusting the flow of crop residue through a spreader and sidewardly outwardly discharge thereof from the spreader for distribution over a field in a desired pattern, including providing a spreader having an inlet opening at the top or front thereof for receiving crop residue, a pair of counter-rotating spreader paddles disposed generally side by side and forward of a back plate of the spreader, and a discharge opening below the spreader paddles;

providing a flow distributor system for use with the spreader including a flow guide element having
  fore and aft ends,
  an apex portion, and
  a pair of opposed arm portions pivotally connected to the apex portion, the arm portions laterally extending to free end portions, the apex portion and the arm portions including surfaces extending longitudinally between the fore and aft ends of the flow guide element, the longitudinally extending surfaces defining crop residue flow surfaces, the flow guide element disposed generally adjacent to the back plate of the spreader and generally intermediate to the spreader paddles, with the aft end generally proximate to the front side of the back plate of the spreader, with the crop residue flow surfaces generally opposite the inlet opening of the spreader, and with at least the free end portions disposed such that the crop residue flow surfaces are located generally extending circumferentially about portions of the spreader paddles and sidewardly outwardly relative thereto to the free end portions of the arm portions of the flow guide element, wherein the arm portions each include an elongated vane extending along the crop residue flow surface of the arm portion, providing an adjusting mechanism operably connected to the arm portions, and operating the adjusting mechanism to effect rotational movement of the arm portions about the apex portion, the movement of the arm portions relative to the spreader paddles adjustably varying the clearance between the outer swept diameters of the pair of spreader paddles and the crop residue flow surfaces of the arm portions, ends of spreader paddle members defining the outer swept diameters of the pair of spreader paddles and the crop residue flow surfaces of at least the arm portions defining clearance regions therebetween, whereby, as a flow of crop residue is introduced into the inlet opening of the spreader, at least a portion of such flow is directed towards the crop residue surfaces of the flow guide element by operation of the counter-rotating spreader paddles and is adjustably directed by the flow guide element, and guided along the crop residue flow surfaces by the elongated vanes for controllably distributing the crop residue in a desired pattern over a field.

20. The method of claim 19, further comprising raising the crop residue relative to a majority of longitudinally extending surfaces of the arm portions as the flow of crop residue flows along the longitudinally extending surfaces of the arm portions.

* * * * *